United States Patent
Ho

(10) Patent No.: US 12,058,269 B2
(45) Date of Patent: Aug. 6, 2024

(54) SYSTEMS AND METHODS FOR PROVIDING SECURE INTERNET OF THINGS DATA NOTIFICATIONS USING BLOCKCHAIN

(71) Applicant: Verizon Patent and Licensing Inc., Basking Ridge, NJ (US)

(72) Inventor: Joseph Ho, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 17/644,708

(22) Filed: Dec. 16, 2021

(65) Prior Publication Data

US 2023/0198771 A1 Jun. 22, 2023

(51) Int. Cl.
| | |
|---|---|
| *H04L 9/08* | (2006.01) |
| *H04L 9/00* | (2022.01) |
| *H04L 9/32* | (2006.01) |
| *H04L 43/065* | (2022.01) |
| *H04L 67/55* | (2022.01) |

(52) U.S. Cl.
CPC .......... *H04L 9/3236* (2013.01); *H04L 9/0866* (2013.01); *H04L 9/3247* (2013.01); *H04L 43/065* (2013.01); *H04L 67/55* (2022.05); *H04L 9/50* (2022.05)

(58) Field of Classification Search
CPC ... H04L 9/3236; H04L 9/0866; H04L 9/3247; H04L 9/50; H04L 43/065; H04L 67/55; H04L 67/12; H04L 2209/805
See application file for complete search history.

(56) References Cited

U.S. PATENT DOCUMENTS

| | | | |
|---|---|---|---|
| 11,615,082 B1 * | 3/2023 | Shrigondekar | G06F 16/245 707/769 |
| 2018/0336515 A1 * | 11/2018 | Mehring | H04L 9/3239 |
| 2020/0065736 A1 * | 2/2020 | Relangi | G06N 20/20 |
| 2021/0233673 A1 * | 7/2021 | Zhang | H04L 63/20 |
| 2021/0241926 A1 * | 8/2021 | Chor | H04W 4/70 |
| 2021/0263969 A1 * | 8/2021 | Sun | G06F 18/23 |
| 2023/0161611 A1 * | 5/2023 | Damiani | B60K 35/10 715/708 |

OTHER PUBLICATIONS

Blockchain framework for IoT data quality via edge computing, by Corchado et al., published 2018 (Year: 2018).*

* cited by examiner

*Primary Examiner* — Vu V Tran

(57) ABSTRACT

A device may receive Internet of Things (IoT) data generated by a plurality of different IoT devices, and may group the IoT data into groups of data packages at configured time intervals or in response to events. The device may generate data notifications for the groups of data packages, and may provide the data notifications to a blockchain node, associated with the device and included in a network of blockchain nodes associated with data consumer devices, to cause the data notifications to be securely provided to corresponding ones of the data consumer devices. The device may receive, from one of the data consumer devices, a request for a data package of the groups, and may authenticate the one of the data consumer devices. The device may provide the data package to the one of the data consumer devices when authenticated.

20 Claims, 12 Drawing Sheets

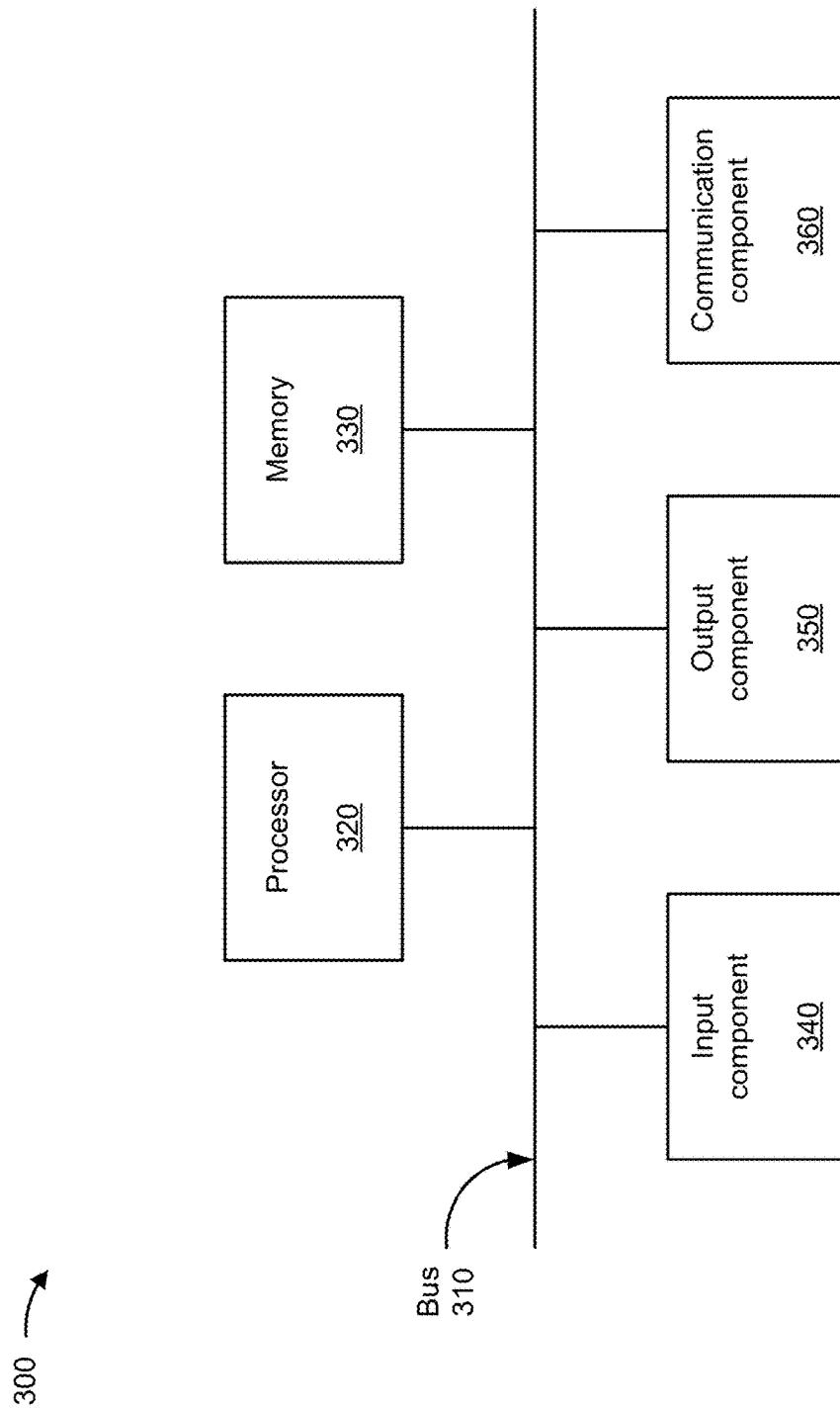

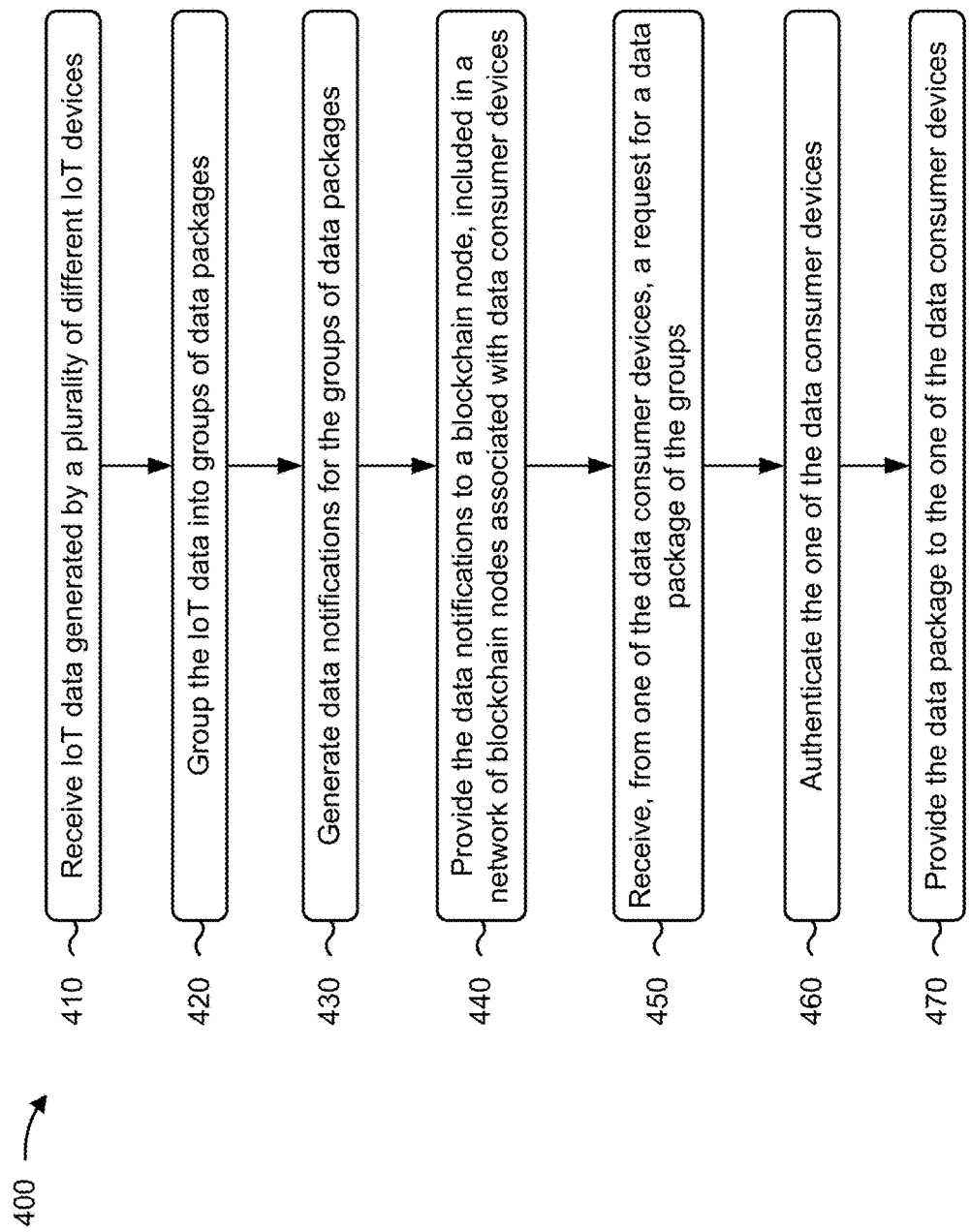

SYSTEMS AND METHODS FOR PROVIDING SECURE INTERNET OF THINGS DATA NOTIFICATIONS USING BLOCKCHAIN

BACKGROUND

The Internet of things (IoT) describes a network of physical objects (e.g., devices, things, and/or the like) that are embedded with sensors, software, and other technologies for various purposes, including collecting, connecting and exchanging data with other devices and systems over a network, such as the Internet.

BRIEF DESCRIPTION OF THE DRAWINGS

FIG. 3 is a diagram of example components of one or more devices of FIG. 3.

FIG. 4 is a flowchart of an example process for providing secure IoT data notifications using blockchain.

DETAILED DESCRIPTION OF EXAMPLE EMBODIMENTS

Figure 1A:
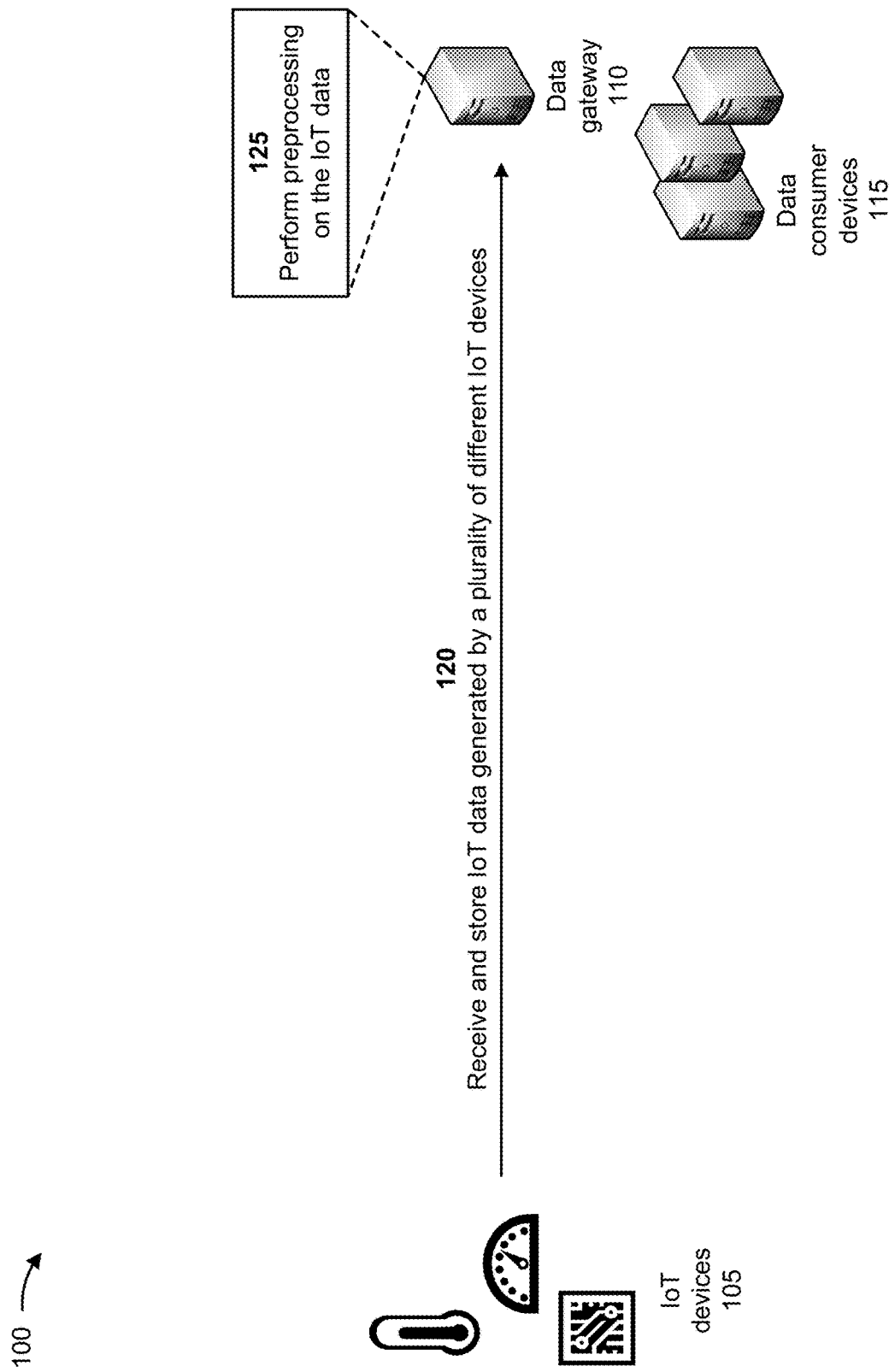
FIGS. 1A-1I are diagrams of an example associated with providing secure IoT data notifications using blockchain.

The following detailed description of example implementations refers to the accompanying drawings. The same reference numbers in different drawings may identify the same or similar elements.

An industrial IoT (IIoT) enables inter-connection of a large number of IoT devices, such as sensors, cameras, controllers, and machines, in an industrial facility. An IIoT enables collection of massive volumes of IoT data from the IoT devices and enables data analytic applications utilize and learn from the IoT data to improve industrial operations. For example, at a manufacturing plant, various sensors can collect environmental measurements, machines can report production process data, such as power consumption, monitoring devices can collect data on the conditions of manufactured food products, and/or the like. The data can then be used by data models (e.g., machine learning or artificial intelligence models) to identify features beneficial to the operation of the manufacturing plant, and/or the data can be used to train machine learning or artificial intelligence models. For instance, an application used by the plant can utilize sensor data to optimize factory operation (e.g., to lower power consumption), another application can utilize manufactured products data to measure product quality and detect non-compliance, another application can help improve visibility of the manufacturing operation (e.g., automatically identifying and notifying personnel about emerging production bottlenecks), and/or the like. Each application may require different IoT data and may be distributed across different edge and/or cloud servers. Thus, the required IoT data has to be made available to each application hosted at specific edge and/or cloud servers. Each application may require a different subset of the IoT data, with a different priority, a different delivery interval, different pre-processing, and other requirements.

Management of the IoT data can become complicated due to the diverse types and sources of the IoT data, and availability times associated with the IoT data. Furthermore, the IoT data needs to be securely acquired from legitimate sources and not tampered with during transit and storage of the IoT data. Notifications about the availability of IoT data also needs to be verifiable and securely acquired. Tampered with or fake IoT data and/or data notifications may result in adverse consequences, such as reduced factory output, loss of revenue, and/or the like. Some IoT systems may not securely provide data notifications of the availability of the IoT data to data consumers, may not ensure that the data notifications, data sources, and the IoT data are valid and authentic, and may not prioritize the data notifications based on priorities of the IoT data. Thus, some IoT systems consume computing resources (e.g., processing resources, memory resources, communication resources, and/or the like), networking resources, and/or other resources associated with providing a complex system to manage sensitive IoT data to security risks, providing a complex system to handle security breaches associated with sensitive IoT data, recovering sensitive IoT data lost in security breaches, losing opportunities that data analytics provide for improving processes, and/or the like.

Some implementations described herein provide a data gateway that provides secure IoT data notifications using blockchain. For example, the data gateway may receive IoT data generated by a plurality of different IoT devices, and may group the IoT data into groups of data packages at configured time intervals or in response to events. The data gateway may generate data notifications for the groups of data packages, and may provide the data notifications to a blockchain node associated with the data gateway and included in a network of blockchain nodes associated with data consumer devices. The data notifications may be securely provided to corresponding ones of the data consumer devices via the network of blockchain nodes. The data gateway may receive, from one of the data consumer devices, a request for a data package of the groups, and may authenticate the one of the data consumer devices. The data gateway may provide the data package to the one of the data consumer devices when the one of the data consumer devices is authenticated.

In this way, the data gateway provides secure IoT data notifications using blockchain. For example, the data gateway may securely provide data notifications about the availability of IoT data for each application that an industrial entity utilizes. The data gateway may enable an application with specific IoT data requirements to gain knowledge of the availability of new IoT data and be able to acquire the new IoT data, while protecting data confidentiality, integrity, and authenticity. The data gateway may utilize a blockchain-based mechanism for advertising IoT data availability. This blockchain-based mechanism may provide for authentication of data notifications and validation of the received IoT data. Thus, the data gateway may conserve computing resources, networking resources, and/or other resources that would have otherwise been consumed by providing a complex system to manage sensitive IoT data to security risks, providing a complex system to handle security breaches associated with sensitive IoT data, recovering sensitive IoT data lost in security breaches, losing opportunities that data analytics provide for improving processes, and/or the like.

FIGS. 1A-1I are diagrams of an example 100 associated with providing secure IoT data notifications using blockchain. As shown in FIGS. 1A-1I, example 100 includes IoT devices 105 associated with a data gateway 110 and data consumer devices 115. Further details of the IoT devices 105, the data gateway 110, and the data consumer devices 115 are provided elsewhere herein. Although implementations described herein relate to IIoT and industrial applications, the implementations may also be applicable to other IoT systems (e.g., smart cities, smart buildings, smart home applications, and/or the like) that increasingly rely on IoT data and analytics to deliver advanced functionalities.

As shown in FIG. 1A, and by reference number 120, the data gateway 110 may receive and store IoT data generated by a plurality of different IoT devices 105. For example, the IoT devices 105 may include sensors (e.g., pressure sensors, temperature sensors, and/or the like), meters (e.g., electric meters), machinery (e.g., a conveyor system that transports raw materials, a product assembly machine, and/or the like), network monitors, and/or the like. The IoT devices 105 may measure a variety of IoT data, such as, for example, pressure readings, temperature readings, electric readings, throughput of a conveyor system, raw materials utilized by the conveyor system, throughput of a product assembly machine, network bandwidth network utilization, and/or the like. The IoT devices 105 may provide such IoT data to the data gateway 110, and the data gateway 110 may receive the IoT data. In some implementations, the data gateway 110 may securely store the IoT data in a data structure (e.g., a database, a table, a list, and/or the like) associated with the data gateway 110. Although blockchains are discussed herein, the implementations may also be utilized with other consensus mechanisms other than blockchains.

In some implementations, the data gateway 110 may interface with the IoT devices 105 and the data consumer devices 115 (e.g., edge devices and/or cloud servers where data storage, analytics, machine learning and other data consuming applications are hosted). The data gateway 110 may support computing and data storage required to acquire, preprocess, store and manage massive quantities of the IoT data, particularly due to a proximity of the data gateway 110 to the IoT devices 105.

As further shown in FIG. 1A, and by reference number 125, the data gateway 110 may perform preprocessing on the IoT data. For example, the data gateway 110 may perform preprocessing on the IoT data by one or more of formatting, filtering, compressing, performing analytics on, and/or the like the IoT data. With regard to formatting, the data gateway 110 may reformat the raw IoT data into one or more formats compatible with applications utilized by the data consumer devices 115. With regard to filtering, the data gateway 110 may select a subset of the IoT data and may utilize the subset for viewing, analysis, and/or the like. The data gateway 110 may store the subset with the complete IoT data in the data structure associated with the data gateway 110. In one example, the data gateway 110 may filter out, from the IoT data, confidential data (e.g., employee data, process parameters, product components, and/or the like), personal data (e.g., personal identification numbers, credit card numbers, and other identifiers), and/or the like. With the regard to compressing, the data gateway 110 may encode, restructure, or otherwise modify the IoT data in order to reduce a size (e.g., in bits) of the IoT data. For example, the data gateway 110 may reencode the IoT data using fewer bits than a quantity of bits utilized in the original IoT data. With regard to performing analytics, the data gateway 110 may calculate key performance indicators (KPIs) based on the IoT data, may calculate trends in the IoT data, may calculate alarm conditions associated with the IoT data, and/or the like.

Figure 1B:
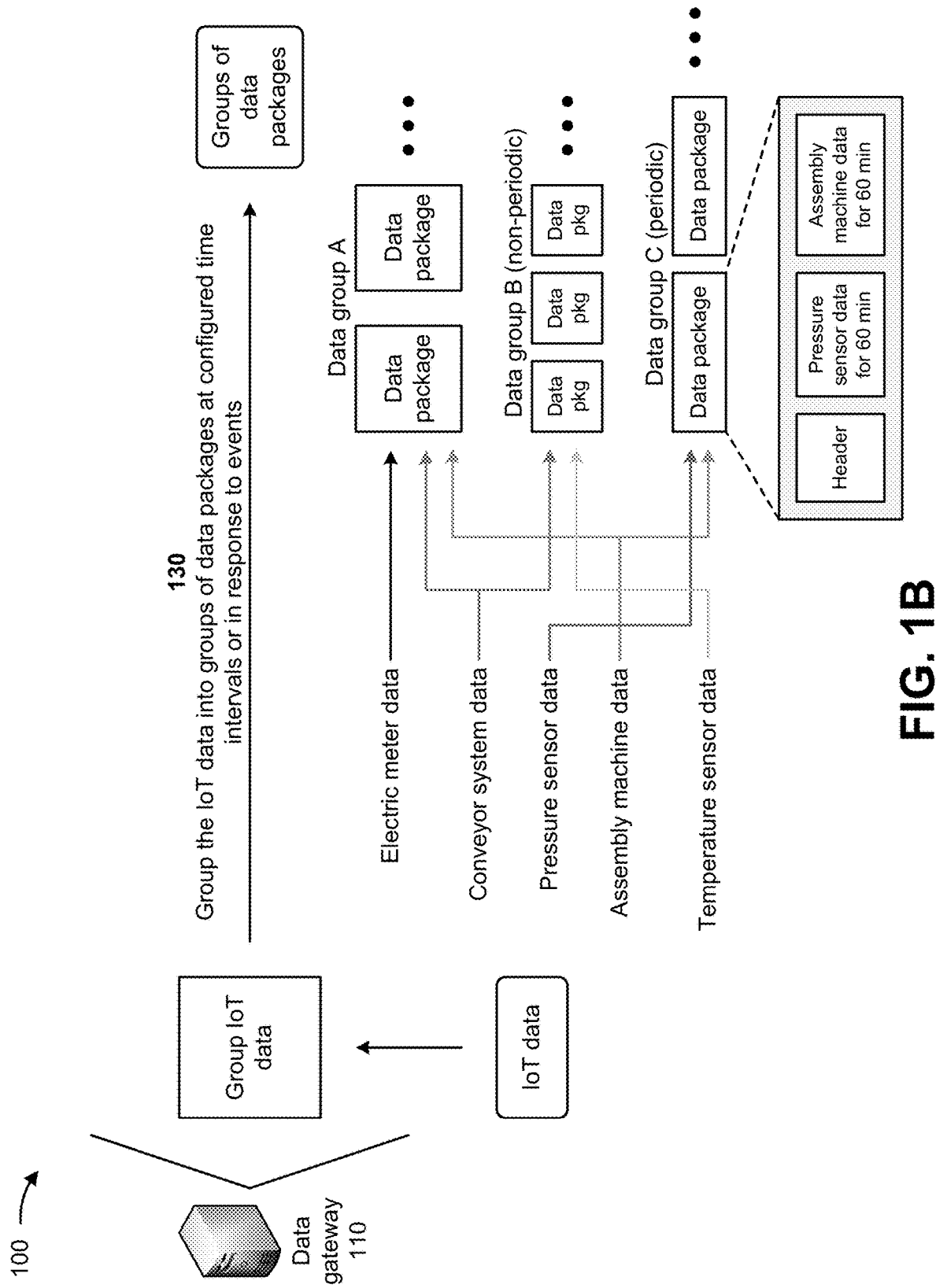

As shown in FIG. 1B, and by reference number 130, the data gateway 110 may group the IoT data into groups of data packages at configured time intervals or in response to events. For example, the data gateway 110 may classify and combine the IoT data into the groups of data packages at the configured time intervals, in response to events, and/or the like. Each group may include one or more types of the IoT data collected by the IoT devices 105. The data gateway 110 may support groups that are commonly used by applications and may create additional groups based on the IoT data requirements of data consumer devices 115.

In many industrial facilities, there exist thousands or even tens of thousands of IoT data generating IoT devices 105 with a wide variety of data types. Each data consumer device 115 may require IoT data generated by different IoT devices 105. The data gateway 110 may classify the available IoT data and may notify the data consumer devices 115 when new IoT data has been collected and can be made available. The data gateway 110 may group IoT data types required by each data consumer device 115 into a group of data packages. The data gateway 110 may notify the data consumer devices 115 when IoT data belonging to a particular group becomes available, as described in more detail below.

As further shown in FIG. 1B, an example industrial site may generate five types of IoT data: electric meter data, conveyor system data, pressure sensor data, assembly machine data, and temperature sensor data. A first data consumer device 115 ($DC_A$) may require the electric meter data, the conveyor system data, and the assembly machine data; a second data consumer device 115 ($DC_B$) may require the conveyor system data and the temperature sensor data; and a third data consumer device 115 ($DC_C$) may require the pressure sensor data and the assembly machine data. In such an example, the data gateway 110 may define three data groups, a first data group ($DG_A$) that includes the electric meter data, the conveyor system data, and the assembly machine data; a second data group ($DG_B$) that includes the conveyor system data and the temperature sensor data; and a third data group ($DG_C$) that includes the pressure sensor data and the assembly machine data.

The third data consumer device 115 ($DC_C$) may require the latest IoT data in sixty-minute increments. Thus, every sixty minutes or less, the data gateway 110 may create a data package that includes the pressure sensor data and the assembly machine data collected since a previous data package was created, and may notify the third data consumer device 115 ($DC_C$) about the availability of the created data package from the third data group ($DG_C$). In some implementations, the data gateway 110 may generate data packages for a data group non-periodically (e.g., when a certain quantity of IoT data becomes available or after an occurrence of specific events). Different data groups may include overlapping IoT data. Furthermore, pre-processed versions of the IoT data may be utilized by the data gateway 110. For example, the data gateway 110 may create another data type that includes the temperature sensor data after redundant information has been removed from the temperature sensor data.

In another example, a fourth data consumer device ($DC_D$) may require output results from an analytics application (e.g., rather than the raw or pre-processed IoT data from the IoT devices 105) that utilizes some of the IoT data as inputs. In such an example, the data gateway 110 may create a fourth data group ($DG_D$) that includes the output results from the analytics application. The data gateway 110 may support certain data groups based on system configurations (e.g., the data gateway 110 may be configured to support some basic data groups by default, which may be used by a broad range of data consumers). The data gateway 110 may also be configured to support more data groups required by the data consumer devices 115 (e.g., after a new data consumer device 115 is added and factory management agrees to provide certain types of data to the new data consumer device 115). The data gateway 110 may group a large quantity of IoT data types into a small quantity of data groups. The data gateway 110 may collect, pre-process, and make available the IoT data belonging to each data group to the data consumer devices 115 periodically at configured time intervals or in response to event occurrences. In this way, the data gateway 110 may simplify the mechanism for notifying the data consumer devices 115 of the availability of new IoT data as described elsewhere herein.

Figure 1C:
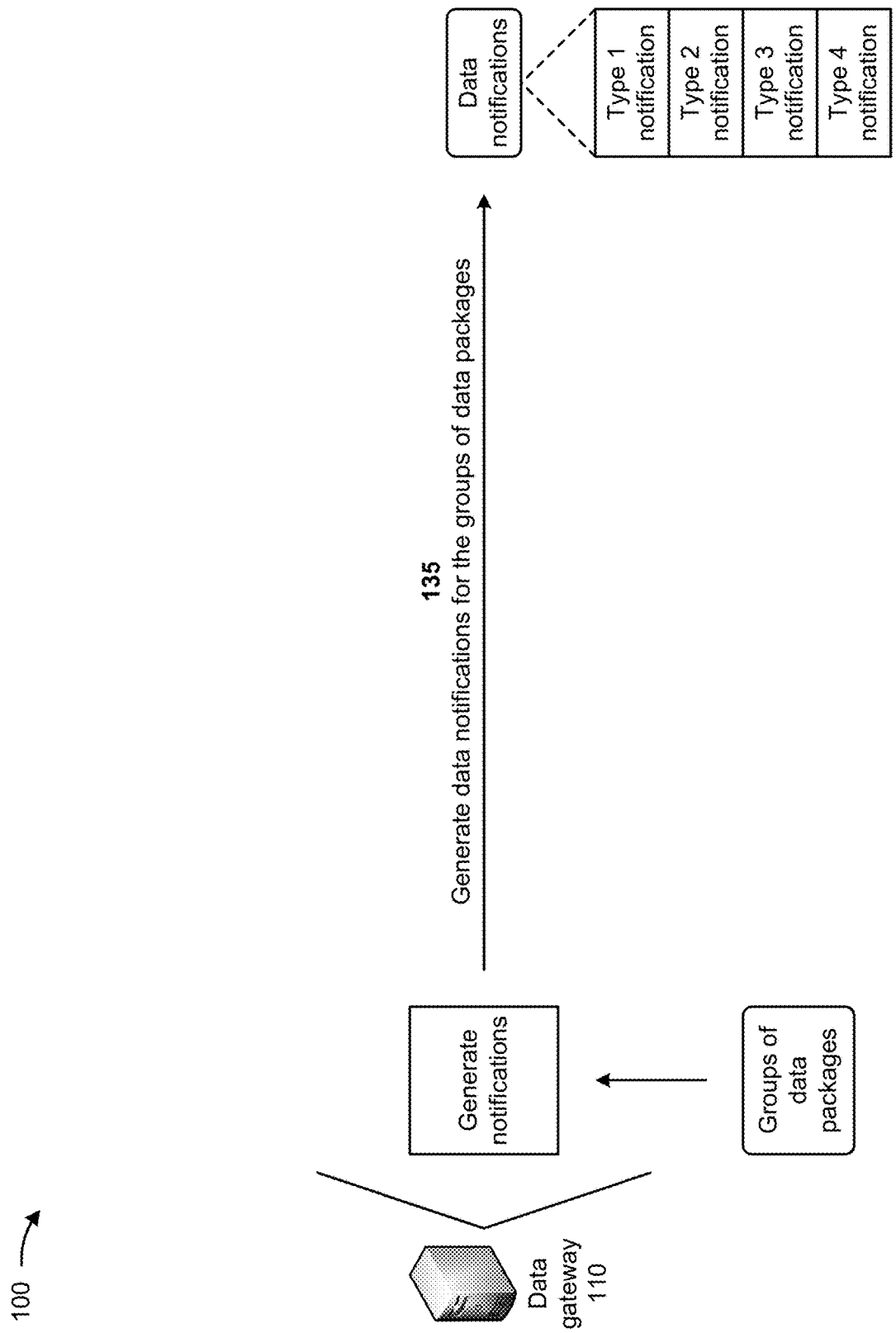

As shown in FIG. 1C, and by reference number 135, the data gateway 110 may generate data notifications for the groups of data packages. For example, the data gateway 110 generate different types of data notifications for the groups of data packages. As shown in FIG. 1C, the data gateway 110 may generate a first type of data notification (e.g., a Type 1 notification), a second type of data notification (e.g., a Type 2 notification), a third type of data notification (e.g., a Type 3 notification), a fourth type of data notification (e.g., a Type 4 notification), and/or the like. The data notifications may be flexible so that the data gateway 110 may publish the availability of a data package to the data consumer devices 115. Further details of the different types of data notifications for the groups of data packages are provided below in connection with FIG. 1D.

Figure 1D:
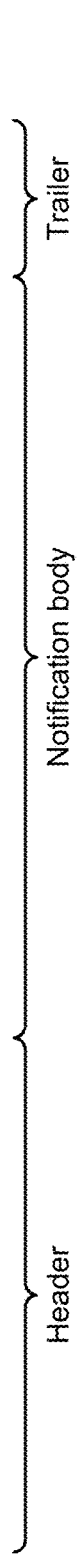
Figure 1D:
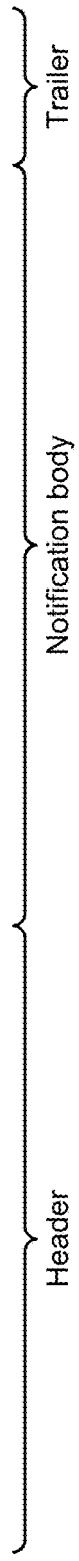
Figure 1D:
Figure 1D:
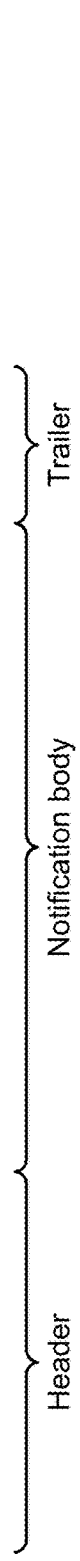

As shown in FIG. 1D, the first type of data notification (e.g., a basic data notification) may include a header portion, a notification body portion, and a trailer portion. The header portion may include a notification type field, a priority field, an expiration date field, and a source node identifier (ID) field. The notification body portion may include a data group type ID field, a data package sequence number field, a start time field, an end time field, a data package size field, and a data package hash field. The trailer portion may include a signature field. The notification type field may indicate a notification type (e.g., a format of the notification body portion). The priority field may specify a priority level of a data package. Several levels of priority may be defined. For example, data notifications with higher priorities may be processed and published before data notifications with lower priorities. A priority for a data group and associated data notifications may be negotiated and configured when the data group is created.

The expiration date field may include a time (e.g., a date) before which the data package being of the notification should be made available to the data consumer devices 115. The source node ID field may provide an identity of the data gateway 110 that generated the data package and created the data notification. The data group ID field may identify the data group to which the data package belongs. The data package sequence number field may include a sequence number of the data package associated the data notification. The sequence number and a data package hash may be utilized to identify the data package (e.g., when requesting to receive the data package from the data gateway 110). The start time field may identify a start time associated with data in the data package. The end time field may identify an end time associated with the data in the data package. The data package size field may identify a size of the data package (e.g., in bytes). The data package hash field may include a hash for the data package (e.g., not a hash of the data notification) that is utilized to verify that the data package is valid. The signature field may include a digital signature of the data notification that is generated by a signing model using a private key of the data gateway 110 and the data notification fields. A data consumer device 115 may authenticate the data notification using this signature to ensure that the data notification came from the data gateway 110.

As further shown in FIG. 1D, the second type of data notification (e.g., a data notification with encrypted fields) may include a header portion, a notification body portion, a trailer portion. The header portion may include a notification type field, a priority field, an expiration date field, a source node ID field, and a target node ID field. The notification body portion may include a data group type ID field, a data package sequence number field, a start time field, an end time field, a data package size field, and a data package hash field. The trailer portion may include a signature field.

The fields of the second type of data notification are the same as the fields of the first type of data notification except that a new data field (e.g., the target node ID field) is added after the source node ID field. The target node ID field may include an ID of the data consumer device 115 for which the notification is intended. The highlighted fields (e.g., the data group type ID field, the data package sequence number field, the start time field, the end time field, the data package size field, and the data package hash field) of the second type of data notification may be encrypted using a public key of the target node identified in the target node ID field. The encrypted portion of the second type of data notification may be decrypted only using a private key of the target node identified in the target node ID field. The first type of data notification and the second type of data notification may enable the data gateway 110 to notify the data consumer devices 115 that a data package is available at the data gateway 110.

In some implementations, the data gateway 110 may provide a duplicate copy of the data package to another data gateway 110, which may act as an alternative location from which to retrieve the data package. In such implementations, the data package may be retrieved from a different device (e.g., another data gateway 110 or another data server) than the device (e.g., the data gateway 110) that generated the data package. As further shown in FIG. 1D, the third type of data notification (e.g., a data notification indicating alternative data storage site, as described above) may include a header portion, a notification body portion, a trailer portion. The header portion may include a notification type field, a priority field, an expiration date field, a source node ID field, and a serving node ID field. The notification body portion may include a data group type ID field, a data package sequence number field, a start time field, an end time field, a data package size field, and a data package hash field. The trailer portion may include a signature field.

The fields of the third type of data notification are the same as the fields of the first type of data notification except that a new data field (e.g., the serving node ID field) is added after the source node ID field. The serving node ID field may include an ID of the serving node from which the data package may be retrieved (e.g., instead of from the data gateway 110). A data consumer device 115 receiving the third type of data notification may authenticate the data notification. However, instead of connecting to the data gateway 110 to retrieve the data package, the data consumer device 115 may connect to the serving node to retrieve the data package. The serving node may authenticate the data consumer device 115 by communicating with the data gateway 110 or may authenticate the data consumer device 115 autonomously if information about access rights to the data package was previously provisioned at the serving node. In some implementations, the data gateway 110 may simultaneously issue the first type of data notification and the third type of data notification for the same data package.

In such implementations, the data package may be available for retrieval from both the data gateway 110 and the serving node.

The fourth type of data notification (e.g., the third type of data notification with encrypted fields) may include the same as the fields of the third type of data notification with the addition of a target node ID field after the serving node ID field. However, the data group type ID field, the data package sequence number field, the start time field, the end time field, the data package size field, and the data package hash field of the fourth type of data notification may be encrypted using a public key of the target node identified in the target node ID field. The encrypted portion of the fourth type of data notification may be decrypted only using a private key of the target node identified in the target node ID field.

In some implementations, a fifth type of data notification may indicate that the data package is available at both the data gateway 110 and the serving node, and a sixth type of data notification may be an encrypted version of the fifth type of data notification. In some implementations, a seventh type of data notification may indicate that the data package is available at multiple nodes, and an eighth type of data notification may be an encrypted version of the seventh type of data notification. The data gateway 110 may support many different types of data notifications that are defined and identified using the notification type field.

The data gateway 110 may notify the data consumer devices 115 of the availability of the streaming data using the methodology described herein, but with a modified data notification format. As further shown in FIG. 1D, the modified data notification (e.g., a data notification for availability of streaming fields) may include a header portion, a notification body portion, and a trailer portion. The header portion may include a notification type field, a priority field, and a source node ID field. The notification body portion may include a data stream ID field, a subscription information field, a streaming status field, a start time field, and an end time field. The trailer portion may include a signature field. The notification type field may indicate a notification type (e.g., a format of the notification body portion). The priority field may identify a priority of the data stream. The source node ID field may provide an identity of the data gateway 110. The data stream ID field may provide an identity of the data stream.

The subscription information field may include subscription information associated with the data stream. The subscription information may include information indicating how to subscribe to the data stream, which may be specific to a type of protocol and streaming platform being used for the data stream. The streaming status field may indicate a state of the data stream. For example, the state of the data stream may be "active" when streaming is ongoing, and "inactive" when streaming has finished. The start time field may indicate a start time of the streaming. The end time field may indicate an expected end time of the streaming. The signature field may include a signature that is generated using a private key of the data streaming service. The data streaming service may be hosted at the data gateway 110, at the far cloud, or on another type of computer server by defining an enhanced data notification type with another field (e.g., field 3a) indicating a serving node ID (e.g., so that the data may be streamed from the serving node instead of the source node). The signature may be verified using a public key of the data streaming service. Other variations of modified data notification may be utilized, such as, for example, an encrypted version of the modified data notification.

Figure 1E:
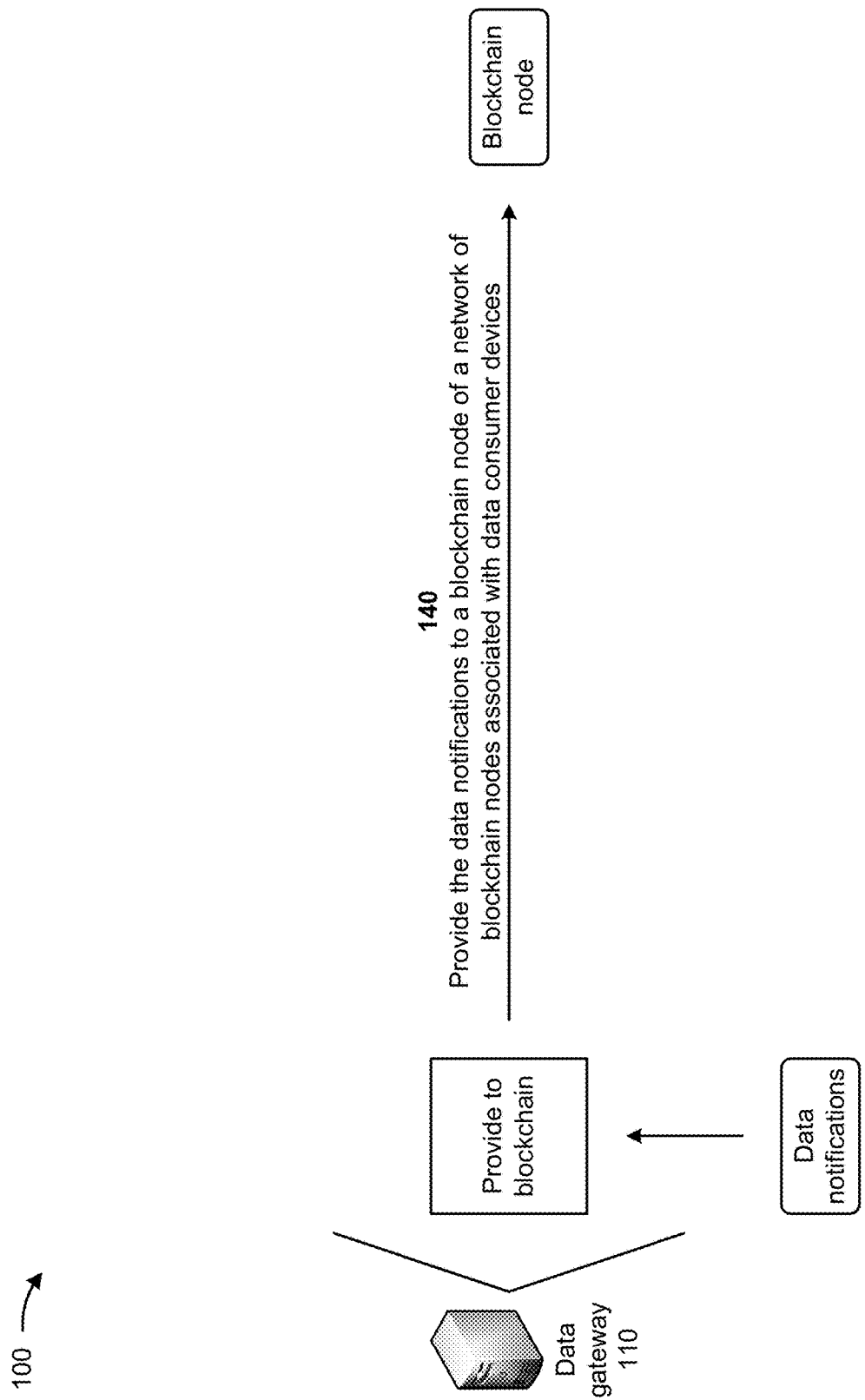

As shown in FIG. 1E, and by reference number 140, the data gateway 110 may provide the data notifications to a blockchain node of network of blockchain nodes associated with data gateway 110. For example, the data gateway 110 may utilize a private blockchain to securely distribute the data notifications to the data consumer devices 115. Only authorized blockchain nodes (e.g., associated with the data consumer devices 115) are allowed to join the private network of blockchain nodes and receive the data notifications. The data gateway 110 may securely notify the data consumer devices 115 of the availability of new data packages using a blockchain-based distributed ledger with additional protocol and data structure designs. The data gateway 110 may prioritize data notifications, validate data notifications, indicate an availability of data packages at locations other than the data gateway 110, and/or the like. Data notification prioritization may enable differentiated treatment of the data notifications (e.g., faster notification for more time-sensitive data) by the blockchain network.

After the data gateway 110 generates a new data notification, the data gateway 110 may passes the data notification to its associated blockchain node. The blockchain node may utilize multiple approaches to create and add a new block, for the new data notification, on the blockchain, as defined by blockchain mining and consensus protocols. One approach suitable for private blockchain is a proof of authority consensus protocol that authorizes a subset of blockchain nodes on the blockchain network (e.g., called validating blockchain nodes) to generate new blocks. The process starts with the blockchain node associated with the data gateway 110 broadcasting new data notifications to the validating blockchain nodes. The validating blockchain nodes may maintain an incoming pool of the new data notifications broadcast by the data gateway 110. The validating blockchain nodes may take turns creating new blocks that contain one or more data notifications from the incoming pool.

At a predefined time interval, a new leader blockchain node may be selected from the validating blockchain nodes (e.g., using a round robin technique) to create a next new block if one or more new data notifications are available in the incoming pool at the beginning of the time interval. The leader blockchain node may authenticate and validate the selected data notification(s) and may create a block that includes the data notification(s). In some implementations, each block may include a predefined data capacity, which may limit the quantity of data notifications each block may contain. If a block is full and the incoming pool is not empty, the remaining data notification(s) may be added to subsequent new block(s) during future block generation intervals. The leader blockchain node send the new block to other validating blockchain nodes on the blockchain network. A consensus procedure may occur among the validating blockchain nodes to accept the new block and add the new block to the blockchain network, or to reject the new block.

For a private blockchain network, communications between blockchain nodes may be secure in that information exchanged among the blockchain nodes may only be seen by authorized blockchain nodes. This may ensure that information about the IoT data is secure and kept confidential. The secure communications may be achieved using a virtual private network (VPN) connection or a key exchange with public and private keys of the communicating blockchain nodes (e.g., a Diffie-Hellman key exchange), and/or the like.

In some implementations, the data gateway 110 may prioritize the data notifications to ensure that more important data notifications are processed and published prior to data notifications of lesser importance. Priority may be based on the agreement between factory management (e.g., owners of the IoT devices 105) and operators of the data consumer devices 115, importance of data packages associated with the data notifications (e.g., absolute priorities of the data packages, deadlines for data packages associated with the data notifications, and other similar priorities), and/or the like. For example, if a data consumer device 115 is expecting new data every ten minutes, the data gateway 110 may provide a data package every ten minutes. In other words, if the data consumer device 115 received a previous data package at 11:40 AM and is expecting a next data package on or before 11:50, the deadline for the next data notification is 11:50. The data gateway 110 may process and include the data notification in the next block with a higher priority as the deadline approaches.

In one example, the data gateway 110 may prioritize the data notifications based on a priority queue with multiple priority levels (e.g., based on absolute priority, deadlines, and/or the like). A first priority level may include data notifications with a highest priority. The data gateway 110 may include the first level priority data notifications in a next block first. A second priority level may include data notifications with close deadlines, such as a deadline that is less than a configurable threshold quantity of minutes from a current time. A third priority level may include data notifications with deadlines greater than configurable threshold quantity of minutes from the current time. A fourth priority level may include less time critical data notifications that may be processed after notifications with tight deadlines have been processed. In such an example, the blockchain network may process the first level priority data notifications first before processing any of the data notifications associated with the other priority levels. In some implementations, only a small quantity of highly important data notifications may be classified in the first priority level.

A third priority level data notification may be dynamically reclassified as second priority level data notification as time progresses and the data notification deadline is approaching the current time. After processing the first priority level data notifications, the blockchain network may process the second priority level data notifications. After processing the second priority level data notifications, the blockchain network may split processing capacity according to a predefined ratio between the third priority level data notifications and the fourth priority level data notifications. For example, the blockchain network may process two third priority level data notifications before processing one fourth priority level data notification.

The blockchain network may be responsible for priority based processing of data notifications, such that data notifications with higher priorities are included in the next block first. Thus, the blockchain network is enhanced to enable the blockchain to interpret the priorities of the data notifications and process the data notifications accordingly. Current blockchain networks process transactions based on a highest transaction fee order. In some implementations, the blockchain network may modify current blockchain techniques by processing data notifications based on a combination of deadlines and priorities. Such a modification may become more important when the data notification traffic load is high. The modification may ensure that important data notifications are not stuck in the queue leading to missed deadlines. For example, the blockchain network may maintain a pool of data notifications received from the data gateways 110. Since a next blockchain block to be generated may include limited data notification capacity, the blockchain network (more specifically, a leader blockchain node) may process the data notifications from the pool based on priority order. Data notifications assigned an absolute highest priority (e.g., a first priority) may be included in the next block first. Followed by data notifications with close deadlines (e.g., a second priority). Then followed by data notifications with longer term deadlines (e.g., a third priority). The remaining data notifications (e.g., a fourth priority) may be included in the next block last. Data notifications with the third or greater priority levels may share the remaining block capacity based on predefined ratios. If the blockchain block being generated is full, the remaining data notifications in the pool may be included in the next block to be generated following the above priority described order.

Figure 1F:
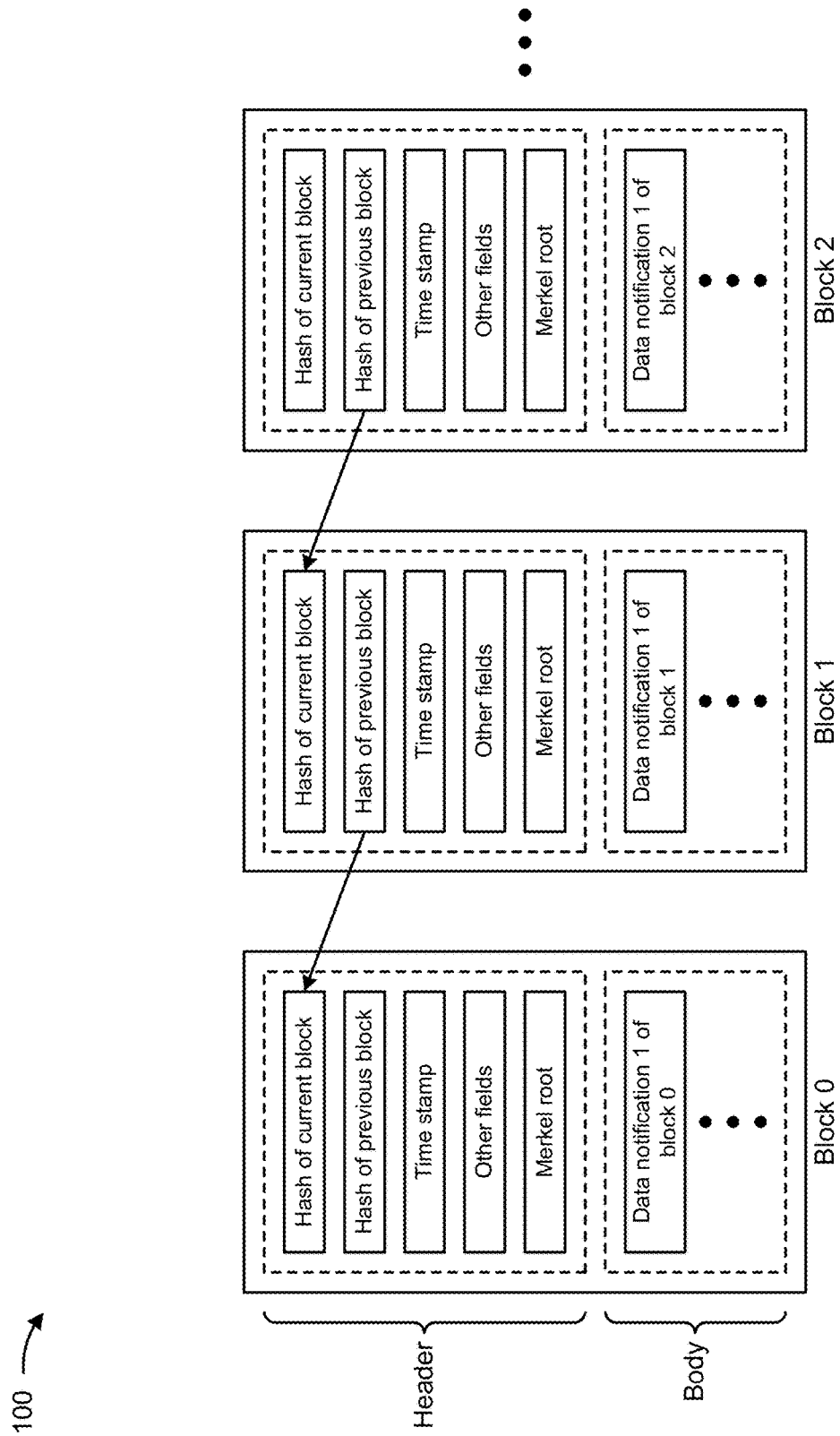

FIG. 1F depicts an example blockchain containing data notifications. A shown, each block (e.g., Block 0, Block 1, Block 2, and/or the like) within the blockchain may include a header portion and a body portion. The header portion may include a hash of a current block, a hash of a previous block, a timestamp, a Merkle Root of a data field (e.g., generated from hash outputs of the data notifications), a blockchain version number, and/or the like. The body portion may include one or more data notifications.

Figure 1G:
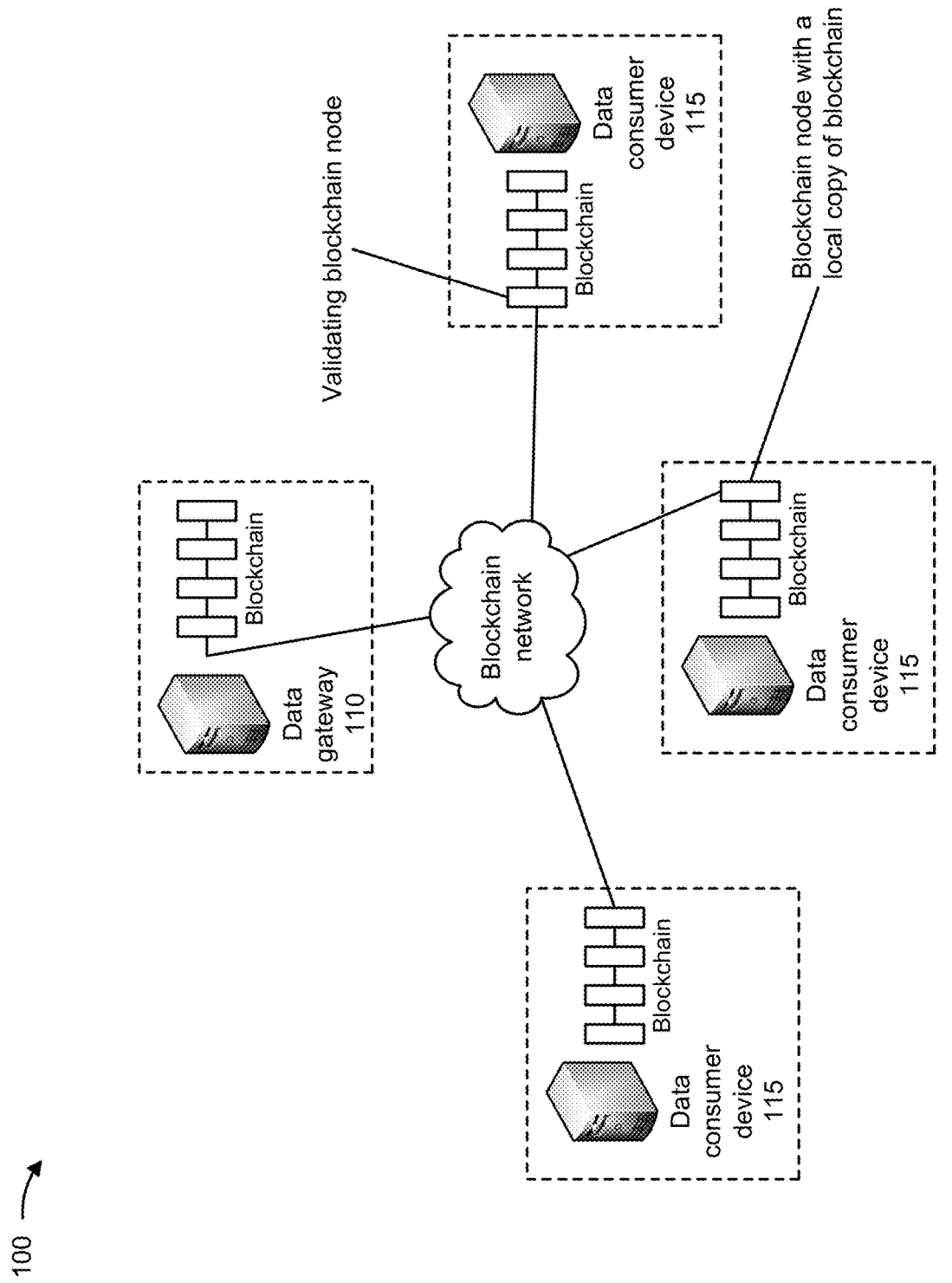

FIG. 1G depicts an example network of blockchain nodes with four blockchain nodes (e.g., the blockchain node associated with the data gateway 110 and blockchain nodes associated with three corresponding data consumer devices 115). Each combination (e.g., represented by a dotted rectangle) may include a blockchain node and a device (e.g., one or more data gateways 110 and/or one or more data consumer devices 115). A blockchain node may support all blockchain operations, such as, for example, the blockchain consensus protocol, storage of a local copy of the blockchain, and/or the like. The data gateway 110 may provide the data notifications to the associated blockchain node for publication to all nodes on the private blockchain network, including the blockchain nodes associated with the data consumer devices 115. Each data consumer device 115 may receive new data notifications from the associated blockchain node after a block containing the data notification has been successfully added to the blockchain and the blockchain node validates the data notifications.

Figure 1H:
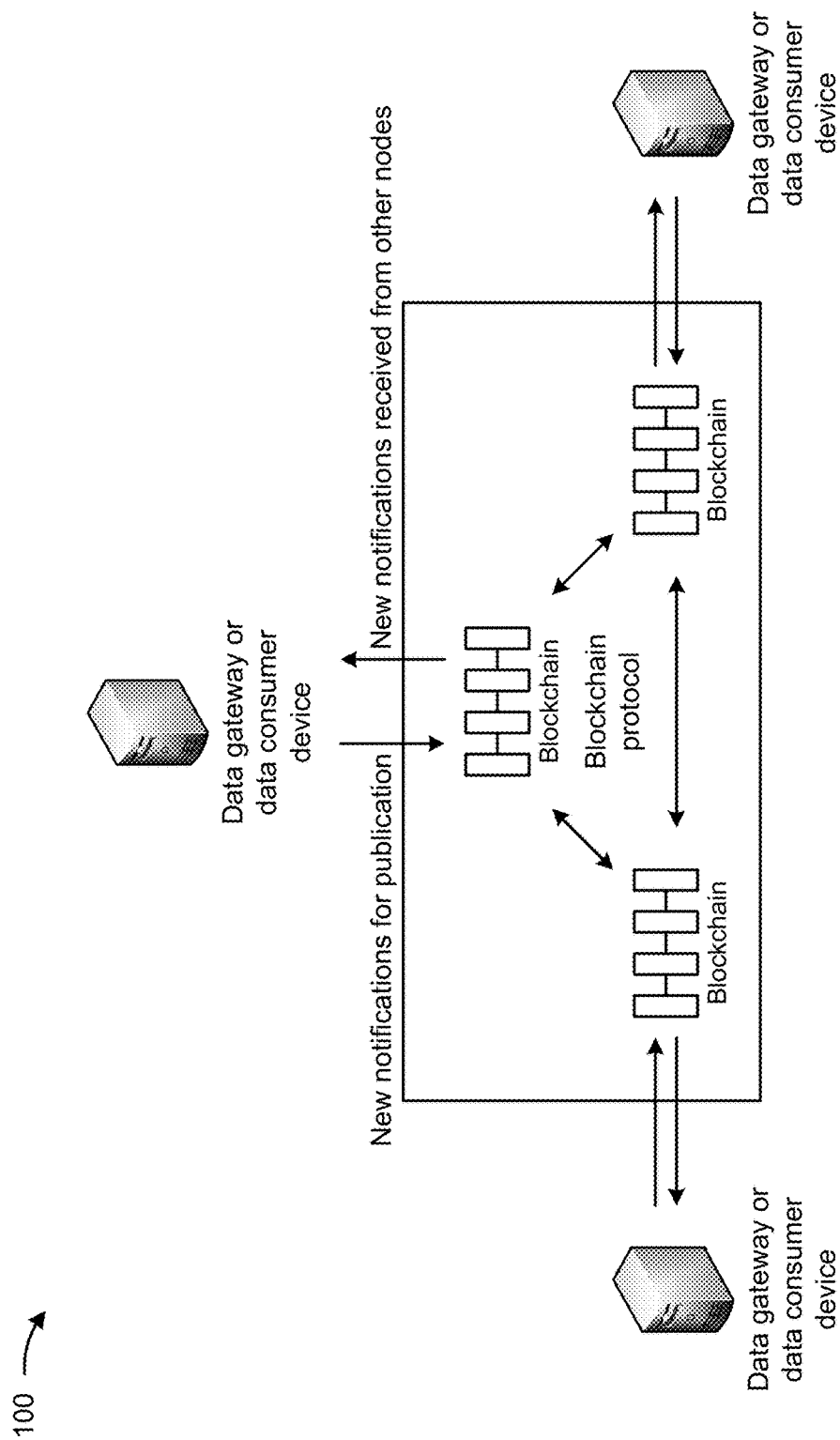

FIG. 1H depicts another example network of blockchain nodes and interactions among the blockchain nodes. As shown, each blockchain node may be associated with the data gateway 110 and/or the data consumer device 115. The blockchain nodes may communicate with each other and support the blockchain consensus protocol. The data gateway 110 may generate new data notifications for publication and may provide the new data notifications to the blockchain node associated with the data gateway 110. The blockchain node may provide the new data notifications to the other blockchain nodes. The blockchain nodes may cooperatively generate new blocks containing the new data notifications and may accept new blocks using a consensus protocol. An accepted new block may then be distributed to all blockchain nodes on the blockchain network, and each blockchain node may add the new block to its local copy of the blockchain. The data consumer devices 115 associated with the other blockchain nodes may receive the new data notifications from the other blockchain nodes.

Adding a blockchain node to the blockchain network may occur when there is a newly authorized data gateway 110 or data consumer device 115 (e.g., approved by relevant authorities, such as a factory security manager). A new blockchain node may be added to the blockchain network by installing software for the new blockchain node on the data gateway 110, generating credentials (e.g., private and public keys) for the new blockchain node, copying the blockchain to the new blockchain node, and distributing information (e.g., a public key of the new blockchain node) about the new blockchain node to other blockchain nodes of the blockchain network.

The data gateway 110 may collect the IoT data from the IoT devices 105, but the IoT data may not be utilizes until the data gateway 110 is configured to support a data group that contains the IoT data, and deliver associated data packages to one or more data consumer devices 115. After successful configuration, the data gateway 110 may generate data packages for the data groups. The data gateway 110 may utilize the blockchain network to notify the data consumer devices 115 about the availability of new data packages belonging to the data group, and may allow authorized data consumer devices 115 to retrieve the data packages.

The data consumer device 115 may be configured to monitor new data packages belonging to one or more data groups and provided by the data gateway 110. After successful configuration, the data consumer device 115 may monitor data notifications, received from the data gateway 110 through the blockchain network, for the availability of data packages belonging to the monitored data groups.

The data gateway 110 may utilize the blockchain network to create a distributed list of data notifications. With the blockchain network and protocol, the data notifications may be published to the blockchain network and distributed to all nodes on the private blockchain network. Information relevant to newly available data packages may be included in the data notifications. The data gateway 110 and the data consumer devices 115 may utilize blockchain functionalities to build a chain of blocks that include data notifications. The blockchain functionalities may include utilizing a hash function to form a chain of blocks; utilizing public key cryptography to sign and authenticate data notifications; allowing blockchain nodes to submit new data notifications to the blockchain; creating a new block on the blockchain with new data notifications; validating the new data notifications and the new block by each blockchain node and then adding the new block to the blockchain; and/or the like.

The data gateway 110 and each data consumer device 115 may be assigned a public and private key pair to enable public-key cryptography. The private key may be kept confidential and may be known only by its owner. The public key may be known by the data gateway 110 and the data consumer devices 115. The public-private key pairs may be utilized to sign data notifications (e.g., so that the data notifications can be authenticated using a signature verification mechanism) and to support asymmetric key encryption. In some implementations, instances of a data consumer device 115 may execute on multiple physical computing devices. In such implementations, the private key of the data consumer device 115 may be installed at more than one computing device. In some implementations, the data gateway 110 may broadcast the data notifications to all data consumers through the blockchain network, and may broadcast confidential data notifications that may only be read by authorized data consumers.

Figure 1I:
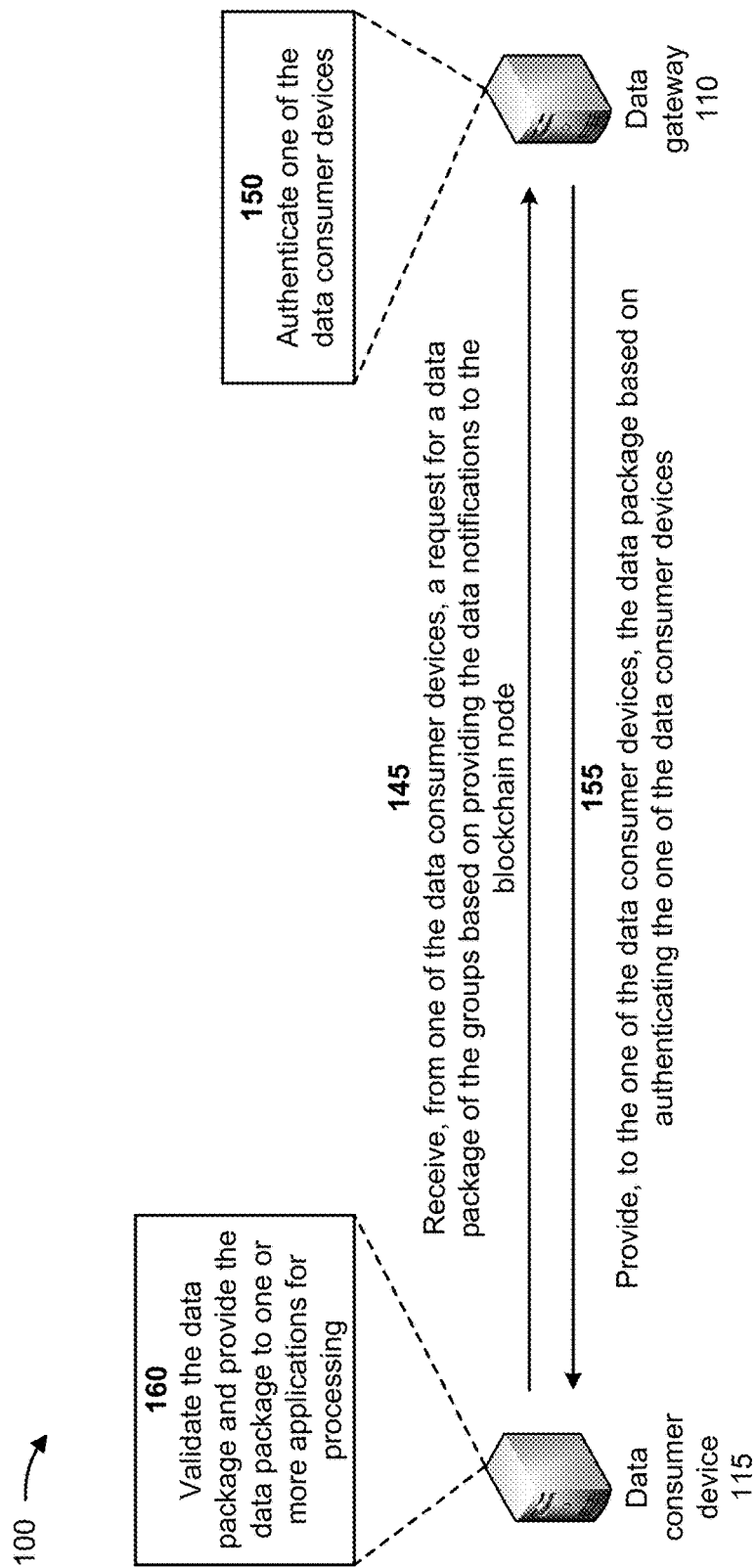

As shown in FIG. 1I, and by reference number 145, the data gateway 110 may receive, from one of the data consumer devices 115, a request for a data package of one of the groups based on providing the data notifications to the blockchain node. For example, the one of the data consumer devices 115 may receive the data notifications, and may determine that the data package of the one of the groups (e.g., identified in one of the data notifications) is to be requested. The one of the data consumer devices 115 may generate the request for the data package of the one of the groups, and may provide the request to the data gateway 110. The data gateway 110 may receive the request for a data package from the one of the data consumer devices 115.

Once a new block is validated and added to the blockchain and the included data notifications are authenticated and provided to the data consumer devices 115, each data consumer device 115 may inspect each data notification in the body of the block. If the data notification is encrypted (e.g., a second type of data notification) and the target node ID is the ID of the data consumer device 115, the data consumer device 115 may decrypt the data notification using the private key before inspecting the block. If the data notification is encrypted and the target node ID is not the ID of the data consumer device 115, the data consumer device 115 may ignore the data notification. In an alternative implementation, if there is a target node ID in the header of a data notification and the data consumer associated with the blockchain node is not the target node, the blockchain node may not provide the data notification to the data consumer. The data consumer device 115 may determine whether the available new data (e.g., as reported by the data notification) is required by the data consumer device 115. If new data is required, the data consumer device 115 may schedule (e.g., via the request for the data package) a download of the data package from the data gateway 110 (e.g., as indicated by the source node ID field) or from an alternative node (e.g., as indicated by the serving node ID field).

The one of the data consumer devices 115 may schedule the download of the data package based on providing the request to the data gateway 110. The data consumer device 115 may initiate the download by setting up a secure connection with the data gateway 110, via an existing VPN connection or by securely negotiating an encryption key using public and private keys (e.g., using a Diffie-Hellman key exchange). Once the secure connection is established, the data consumer device 115 may request the data package from the data gateway 110 using the data package type ID field, the data package sequence number field, and the data packet hash field as identifiers. Other fields, such as the start time field and the end time field, may also be provided to identify the data package.

As further shown in FIG. 1I, and by reference number 150, the data gateway 110 may authenticate one of the data consumer devices 115. For example, the data gateway 110 may determine whether one of the data consumer devices 115 is authorized to receive the data package identified in the request received from the one of the data consumer devices 115. If the one of the data consumer devices 115 is authorized to receive the data package, the data gateway 110 may allow the one of the data consumer devices 115 to retrieve the data package. If the one of the data consumer devices 115 is not authorized to receive the data package, the data gateway 110 may prohibit the one of the data consumer devices 115 from retrieving the data package.

As further shown in FIG. 1I, and by reference number 155, the data gateway 110 may provide, to the one of the data consumer devices 115, the data package based on authenticating the one of the data consumer devices 115. For example, if the data gateway 110 determines that the one of the data consumer devices 115 is authorized to receive the data package, the data gateway 110 may provide the data package to the one of the data consumer devices 115.

As further shown in FIG. 1I, and by reference number 160, the data consumer device 115 may validate the data package and may provide the data package to one or more applications for processing. For example, when the one of the data consumer devices 115 acquires the data package, the one of the data consumer devices 115 may generate a hash for the data package using the same hash function originally used to generate the hash in the data package hash field of the data notification. The one of the data consumer devices 115 may compares the generated hash with the hash in the data package hash field in the data notification. If hashes are the same, the one of the data consumer devices 115 may determine that the data package is validated. When data package is validated, the one of the data consumer devices 115 may provide the data package to one or more applications for processing. If hashes are not the same, the one of the data consumer devices 115 may determine that the data package is not validated. When data package is not validated, the one of the data consumer devices 115 may discard the data package.

In some implementations, the one of the data consumer devices 115 may utilize multiple artificial intelligence, machine learning, and/or data analytics applications to process the data package. For example, a particular application may require data from all temperature and pressures sensors and may also need access to logs from specific types of machines, some applications may work with unprocessed raw data from the IoT devices 105, some other applications may benefit from data pre-processing (e.g., reformatting and contextualization), and/or the like.

The authenticity and integrity of the IoT data is important for industrial operations. For example, a manufacturing process optimization application may rely on the data package to generate a set of optimal machine configurations to maximize production throughput. If the data package has been tampered with and does not reflect actual conditions detected by the IoT devices 105, the application may not be able to generate optimal configurations for the machines. Furthermore, an adversary may tamper with the IoT data with the intention to slow down production, which may result in financial losses and other consequences. However, the secure nature of the communications between the data gateway 110 and the data consumer device 115 prevents such situations from occurring.

In this way, the data gateway 110 provides secure IoT data notifications using blockchain. For example, the data gateway 110 may securely provide data notifications about the availability of IoT data for each application that an industrial entity utilizes. The data gateway 110 may enable an application with specific IoT data requirements to gain knowledge of the availability of new IoT data and be able to acquire the new IoT data, while protecting data confidentiality, integrity, and authenticity. The data gateway 110 may utilize a blockchain-based mechanism for advertising IoT data availability. This blockchain-based mechanism may provide for authentication of data notifications and validation of the received IoT data. Thus, the data gateway 110 may conserve computing resources, networking resources, and/or other resources that would have otherwise been consumed by exposing sensitive IoT data to security risks, handling security breaches associated with sensitive IoT data, recovering sensitive IoT data lost in security breaches, losing opportunities that data analytics provide for improving processes, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
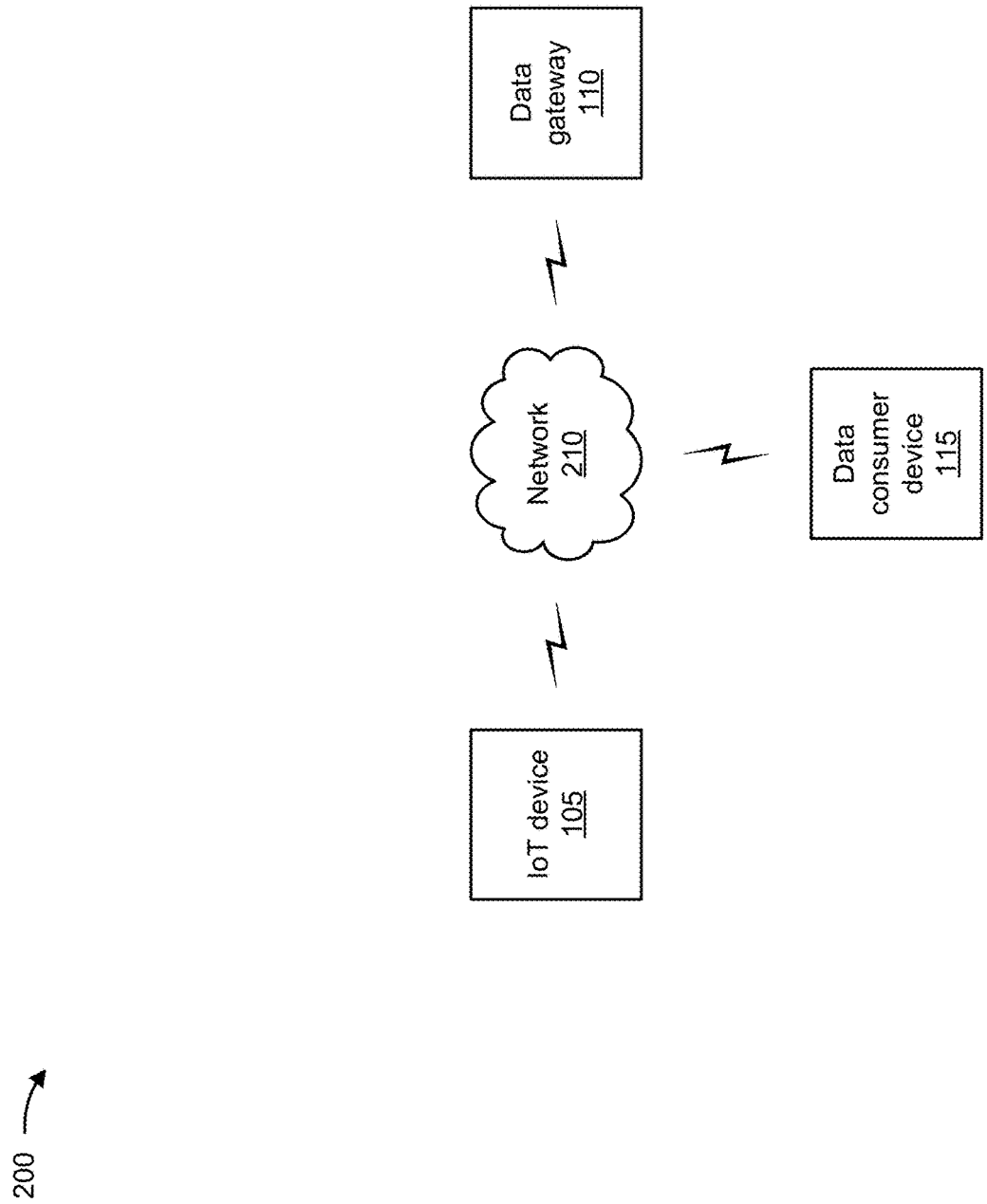
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the IoT device 105, the data gateway 110, the data consumer device 115, and a network 210. Devices of the environment 200 may interconnect via wired connections, wireless connections, or a combination of wired and wireless connections.

The IoT device 105 includes one or more devices capable of receiving, generating, storing, processing, and/or providing information, as described elsewhere herein. The IoT device 105 may include a communication device. For example, the IoT device 105 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), a video camera, a meter, a sensor, a connected vehicle, a tracker, an alarm panel, a manufacturing control system, or a similar type of device.

The data gateway 110 includes one or more devices capable of receiving, generating, storing, processing, and/or providing information, such as information described herein. For example, the data gateway 110 may include a laptop computer, a tablet computer, a desktop computer, a group of server devices, a cloud-based device, or a similar type of device, associated with multicast traffic. In some implementations, the data gateway 110 may receive information from and/or transmit information to the IoT device 105 and/or the data consumer device 115, via the network 210.

The data consumer device 115 includes one or more devices capable of receiving, generating, storing, processing, and/or providing information, such as information described herein. For example, the data consumer device 115 may include a laptop computer, a tablet computer, a desktop computer, a group of server devices, a cloud-based device, or a similar type of device, associated with multicast traffic. In some implementations, the data consumer device 115 may receive information from and/or transmit information to the IoT device 105 and/or the data gateway 110, via the network 210.

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of example components of a device 300, which may correspond to the IoT device 105, the data gateway 110, and/or the data consumer device 115. In some implementations, the IoT device 105, the data gateway 110, and/or the data consumer device 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing secure IoT data notifications using blockchain. In some implementations, one or more process blocks of FIG. 4 may be performed by a device (e.g., the data gateway 110). In some implementations, one or more process blocks of FIG. 4 may be performed by another device or a group of devices separate from or including the device, such as an IoT device (e.g., the IoT device 105) and/or a data consumer device (e.g., the data consumer device 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving IoT data generated by a plurality of different IoT devices (block 410). For example, the device may receive IoT data generated by a plurality of different IoT devices, as described above. In some implementations, the IoT data includes data associated with one or more of an electric meter, a conveyor system that transports raw materials, a pressure sensor, a product assembly machine, or a temperature sensor.

As further shown in FIG. 4, process 400 may include grouping the IoT data into groups of data packages at configured time intervals or in response to events (block 420). For example, the device may group the IoT data into groups of data packages at configured time intervals or in response to events, as described above. In some implementations, each of the groups of data packages includes non-periodic data packages or periodic data packages.

As further shown in FIG. 4, process 400 may include generating data notifications for the groups of data packages (block 430). For example, the device may generate data notifications for the groups of data packages, as described above. In some implementations, each of the data notifications includes information indicating that a corresponding one of the groups of data packages are available for consumption. In some implementations, each of the data notifications includes one or more of a notification type field, a priority field, an expiration time field, a source node identifier field, a data group identifier field, a sequence number field, a start time field, an end time field, a data package size field, a data package hash field, or a signature field. In some implementations, a portion of the each of the data notifications is encrypted.

As further shown in FIG. 4, process 400 may include providing the data notifications to a blockchain node, associated with the device and included in a network of blockchain nodes associated with data consumer devices, to cause the data notifications to be securely provided to corresponding ones of the data consumer devices (block 440). For example, the device may provide the data notifications to a blockchain node, associated with the device and included in a network of blockchain nodes associated with data consumer devices, to cause the data notifications to be securely provided to corresponding ones of the data consumer devices, as described above. In some implementations, the device utilizes public key cryptography to sign the data notifications so that the data notifications may be authenticated by the corresponding ones of the data consumer devices.

As further shown in FIG. 4, process 400 may include receiving, from one of the data consumer devices, a request for a data package of the groups based on providing the data notifications to the blockchain node (block 450). For example, the device may receive, from one of the data consumer devices, a request for a data package of the groups based on providing the data notifications to the blockchain node, as described above. In some implementations, the data consumer devices validate the data notifications prior to generating requests for the data packages of the groups of data packages. In some implementations, providing a data notification associated with the one of the groups causes the one of the data consumer devices to generate the request for the data package of the one of the groups.

As further shown in FIG. 4, process 400 may include authenticating the one of the data consumer devices (block 460). For example, the device may authenticate the one of the data consumer devices, as described above.

As further shown in FIG. 4, process 400 may include providing the data package to the one of the data consumer devices based on authenticating the one of the data consumer devices (block 470). For example, the device may provide the data package to the one of the data consumer devices based on authenticating the one of the data consumer devices, as described above. In some implementations, providing the data package to the one of the data consumer devices causes the one of the data consumer devices to validate the data package and provide the data package, when validated, to one or more applications for processing. In some implementations, providing the data package to the one of the data consumer devices includes causing another device to provide the data package to the one of the data consumer devices.

In some implementations, process 400 includes prioritizing the data notifications based on two or more priority levels.

In some implementations, process 400 includes associating priorities with the data notifications, and the blockchain node processes the data notifications based on the priorities associated with the data notifications.

In some implementations, process 400 includes preventing the one of the data consumer devices from receiving the data package based on failing to authenticate the one of the data consumer devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, Internet of Things (IoT) data generated by a plurality of different IoT devices;
   performing, by the device, reformatting and contextualization on the IoT data into one or more formats compatible with one or more applications associated with data consumer devices;
   grouping, by the device, the IoT data into groups of data packages at configured time intervals or in response to events;
   generating, by the device, data notifications for the groups of data packages;
   providing, by the device, the data notifications to a blockchain node, associated with the device and included in a network of blockchain nodes associated with the data consumer devices, to cause the data notifications to be securely provided to corresponding ones of the data consumer devices;
   receiving, by the device, from one of the data consumer devices, a request for a data package of the groups of data packages based on providing the data notifications to the blockchain node;
   authenticating, by the device, the one of the data consumer devices; and
   providing, by the device, the data package to the one of the data consumer devices based on authenticating the one of the data consumer devices.

2. The method of claim 1, further comprising:
   prioritizing the data notifications based on two or more priority levels.

3. The method of claim 1, wherein providing the data package to the one of the data consumer devices comprises:
   causing another device to provide the data package to the one of the data consumer devices.

4. The method of claim 1, wherein providing the data package to the one of the data consumer devices causes the one of the data consumer devices to validate the data package and provide the data package, when validated, to the one or more applications for processing.

5. The method of claim 1, wherein each of the groups of data packages includes non-periodic data packages or periodic data packages.

6. The method of claim 1, wherein each of the data notifications includes information indicating that a corresponding one of the groups of data packages is available for consumption.

7. The method of claim 1, further comprising:
   associating priorities with the data notifications,
   wherein the blockchain node processes the data notifications based on the priorities associated with the data notifications.

8. A device, comprising:
   one or more processors implemented at least partially in hardware, the one or more processors configured to:
   receive Internet of Things (IOT) data generated by a plurality of different IoT devices;
   perform preprocessing on the IOT data by performing reformatting and contextualization on the IoT data into one or more formats compatible with one or more applications associated with data consumer devices;
   group the IoT data into groups of data packages at configured time intervals or in response to events;
   generate data notifications for the groups of data packages;
   provide the data notifications to a blockchain node, associated with the device and included in a network of blockchain nodes associated with the data consumer devices, to cause the data notifications to be securely provided to corresponding ones of the data consumer devices;
   receive from one of the data consumer devices, a request for a data package of the groups of data packages based on providing the data notifications to the blockchain node;
   authenticate the one of the data consumer devices; and
   provide the data package to the one of the data consumer devices based on authenticating the one of the data consumer devices.

9. The device of claim 8, wherein the data consumer devices validate the data notifications prior to generating requests for the data packages of the groups of data packages.

10. The device of claim 8, wherein providing a data notification associated with the one of the groups of data packages causes the one of the data consumer devices to generate the request for the data package of the one of the groups of data packages.

11. The device of claim 8, wherein the one or more processors are further configured to:
    prevent the one of the data consumer devices from receiving the data package based on failing to authenticate the one of the data consumer devices.

12. The device of claim 8, wherein the device utilizes public key cryptography to sign and authenticate the data notifications so that the data notifications are securely provided to the corresponding ones of the data consumer devices.

13. The device of claim 8, wherein each of the data notifications includes one or more of:
    a notification type field,
    a priority field,
    an expiration time field,
    a source node identifier field,
    a data group identifier field,
    a sequence number field,
    a start time field,
    an end time field,
    a data package size field,
    a data package hash field, or
    a signature field.

14. The device of claim 8, wherein a portion of the each of the data notifications is encrypted.

15. A non-transitory computer-readable medium storing a set of instructions, the set of instructions comprising:
    one or more instructions that, when executed by one or more processors of a device, cause the device to:
    receive Internet of Things (IoT) data generated by a plurality of different IoT devices;

perform reformatting and contextualization of the IoT data into one or more formats compatible with one or more applications associated with data consumer devices;

group the IoT data into groups of data packages at configured time intervals or in response to events;

generate data notifications for the groups of data packages;

provide the data notifications to a blockchain node, associated with the device and included in a network of blockchain nodes associated with the data consumer devices, to cause the data notifications to be securely provided to corresponding ones of the data consumer devices,
  wherein the device utilizes public key cryptography to sign and authenticate the data notifications so that the data notifications are securely provided to the corresponding ones of the data consumer devices;

receive from one of the data consumer devices, a request for a data package of the groups of data packages based on providing the data notifications to the blockchain node;

authenticate the one of the data consumer devices; and provide the data package to the one of the data consumer devices based on authenticating the one of the data consumer devices.

16. The non-transitory computer-readable medium of claim 15, wherein the one or more instructions further cause the device to:

perform preprocessing on the IoT data by one or more of filtering, compressing, or performing analytics on the IoT data.

17. The non-transitory computer-readable medium of claim 15, wherein each of the data notifications includes information indicating that a corresponding one of the groups of data packages are available for consumption.

18. The non-transitory computer-readable medium of claim 15, wherein the one or more instructions further cause the device to:

associate priorities with the data notifications,
  wherein the one or more instructions, that cause the device to provide the data notifications to the blockchain node, cause the device to:
    provide the data notifications to the blockchain node based on the priorities associated with the data notifications.

19. The non-transitory computer-readable medium of claim 15, wherein the data consumer devices validate the data notifications prior to generating requests for the data packages of the groups of data packages.

20. The non-transitory computer-readable medium of claim 15, wherein the one or more instructions further cause the device to:

prevent the one of the data consumer devices from receiving the data package based on failing to authenticate the one of the data consumer devices.

* * * * *